March 9, 1943. H. F. VICKERS ET AL 2,313,407
POWER TRANSMISSION
Filed Aug. 30, 1940
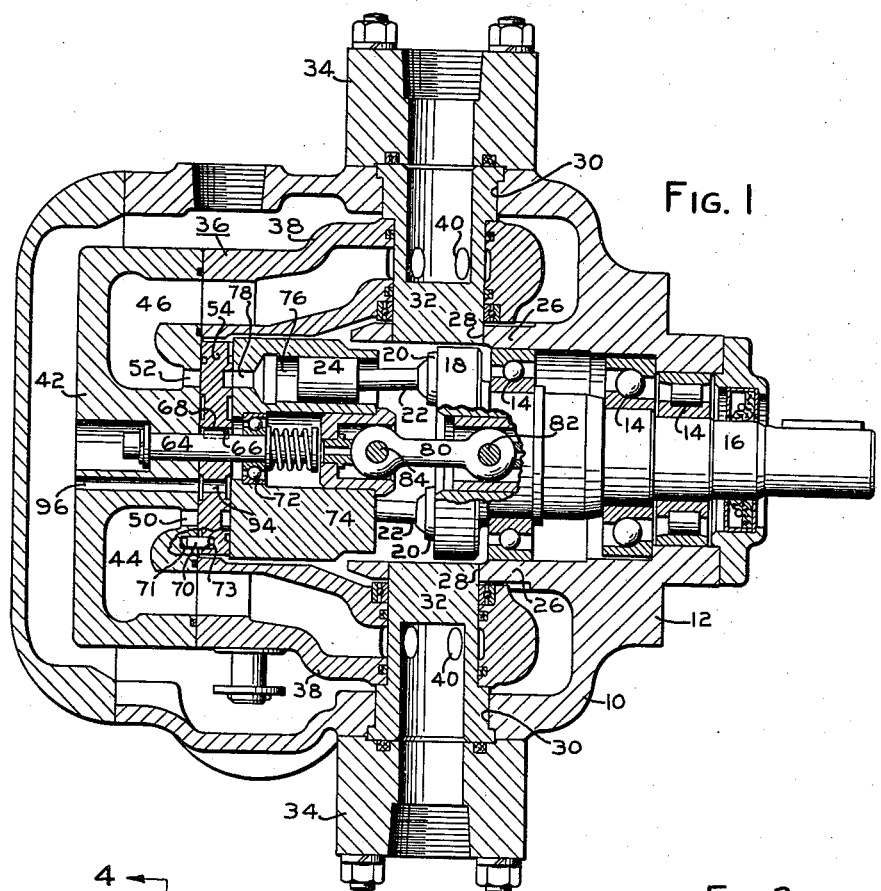
Fig. 1
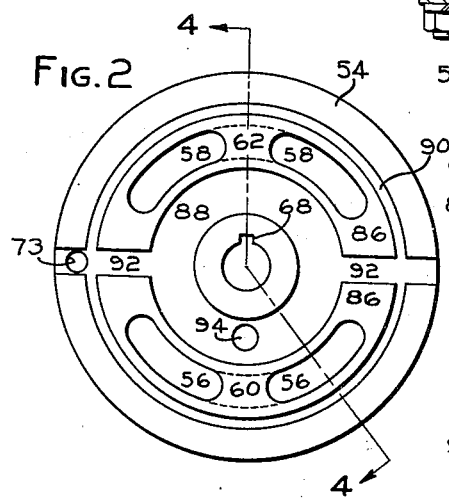
Fig. 2  Fig. 4  Fig. 3
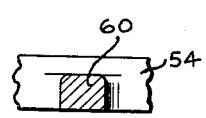
Fig. 5
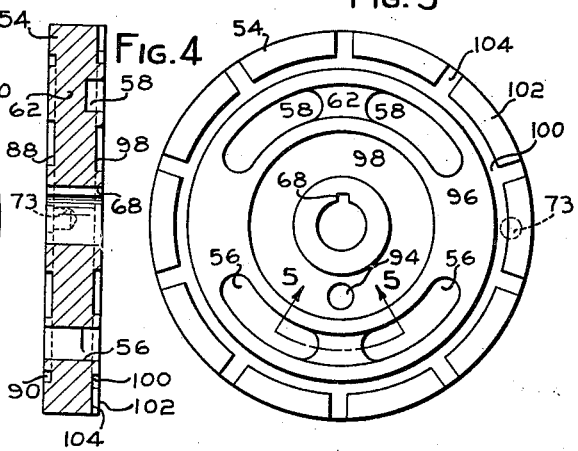
INVENTORS
HARRY F. VICKERS &
KENNETH R. HERMAN
BY Ralph L. Tweedale
ATTORNEY Patented Mar. 9, 1943

2,313,407

UNITED STATES PATENT OFFICE 2,313,407

POWER TRANSMISSION

Harry F. Vickers and Kenneth R. Herman, Detroit, Mich., assignors to Vickers Incorporated, Detroit, Mich., a corporation of Michigan Application August 30, 1940, Serial No. 354,776

5 Claims. (Cl. 103—162)

This application is a continuation in part of application Serial No. 265,012, filed March 30, 1939, for Power transmission.

This invention relates to power transmissions and more particularly to those of the type comprising two or more fluid pressure energy translating devices, one of which may function as a pump and another as a fluid motor. In such devices of the type which comprise a revolving cylinder barrel having a plurality of parallel cylinder bores therein within which pistons are reciprocated by a swash plate device, it is customary to provide a rotary valving mechanism which is operated by the rotation of the cylinder barrel itself for the purpose of alternately connecting each cylinder bore with the inlet and outlet passages of the device. Many machines of this character utilize a plate type valve formed by a flat surface of the cylinder barrel which runs in abutting and in fluid sealing relationship on a stationary flat valve plate. The plate type valve may be so constructed that the cylinder barrel is constantly pressed into engagement with the valve plate so that the clearance at the valve is automatically adjusted to take care of variations in oil viscosity and to compensate for wear. This is a distinct advantage and contributes much to the reliability and long life of machines employing a valve of this character.

In machines operating at high speeds and high hydraulic pressures considerable difficulty has been experienced in the past in attempting to provide satisfactory conditions at the running surface between the cylinder barrel and valve plate. At this bearing surface excessive wear and galling is frequently encountered unless the combination of metals used for the two members is correct and various other designs and manufacturing considerations are closely controlled.

It is an object of the present invention to alleviate these difficulties by utilizing a removable wear plate forming the rubbing surface of the valve plate, which wear plate may be constructed of very hard steel and may thus permit the use of a bronze of the hardness and strength necessary to form the cylinder barrel.

It is also an object to provide a construction wherein the wear plate is not rigidly secured to the valve plate supporting structure but is free to float between the same and the cylinder barrel.

Further objects and advantages of the present invention will be apparent from the following description, reference being had to the accompanying drawing wherein a preferred form of the present invention is clearly shown.

In the drawing:

Figure 1 is a longitudinal cross section of a fluid pressure energy translating device embodying a preferred form of the present invention.

Figure 2 is a view of a valve plate incorporated in Figure 1.

Figure 3 is a view of the valve plate of Figure 2 shown from the opposite side.

Figure 4 is a cross section on line 4—4 of Figure 2.

Figure 5 is a cross section on line 5—5 of Figure 3.

The embodiment of the invention selected for illustration comprises a pump of the same general class as that illustrated in the patent to Hans Thoma, No. 1,931,969, and comprises generally a main frame member 10 having a mounting shoulder 12 thereon and provided with bearings 14 on which a main shaft 16 is journalled. The shaft 16 is provided with a socket flange 18 carrying a plurality of ball sockets 20 in which are mounted ball-ended connecting rods 22 carrying reciprocating pistons 24. The casing member 10 is provided with two inwardly projecting tongues 26 having bores 28 in alignment with similar bores 30 formed in the side walls of the main casing member. Positioned in the bores 30 are hollow trunnions 32 which communicate with pipe flanges 34 secured to the outside of the casing.

Journalled on the trunnions 32 intermediate the side walls of the casing and the tongues 26 is a yoke 36 having hollow arms 38 which communicate with the interior bore of the trunnions 32 through radial passages 40. The yoke 36 is formed by securing the two arms 38 to a main valve plate or supporting plate 42 having internal passages 44 and 46 which communicate with the hollow arms 38. The passages 44 and 46 lead to a pair of arcuate ports 50 and 52.

Mounted on the righthand face of the supporting plate 42 is a wear plate 54 having arcuate ports 56 and 58 which register with the ports 50 and 52, respectively. The plate 54 may be strengthened by the provision of bridge portions 60 and 62 which extend across the ports 56 and 58 at their mid portion. The bridge portions are of less axial length, however, than the thickness of the plate 54, as is clearly shown in Figure 5. The plate 54 is mounted upon a stationary stub shaft 64 rigidly secured to the supporting plate 42 and having a key 66 slidably mounted in a key way 68 which is formed in the wear plate 54.

A dowel 70 is also provided with a sliding fit in holes 71 and 73 in plates 42 and 54 so that the plate 54 is maintained against lateral or angular displacement with respect to the plate 42 but is free to move in an axial direction toward and away from the plate 42.

Journalled on a ball bearing 72 carried by the shaft 64 is a cylinder barrel 74 having an odd number of cylinders 76 in which the pistons 24 are reciprocable. Each cylinder is provided with a cylinder port 78 adapted to register alternately with the ports 56 and 58 as the barrel is rotated. The barrel for this purpose is driven from the shaft 16 through the medium of a cardan shaft 80 having universal joints 82 and 84.

The construction of the two opposite faces of the wear plate 54 is shown more clearly in Figures 2, 3 and 4. Figure 2 illustrates the lefthand face of the wear plate in Figure 1, that is, the surface which abuts against the supporting plate 42. It will be seen that this face is provided with an interrupted annular surface 86 in which the two ports 56 and 58 are included. Grooves 88 and 90 are formed inwardly and outwardly of the annular face 86 and are connected together and to the space at the circumference of the plate by radial grooves 92. A hole 94 is formed in the plate within the groove 88 in register with a hole 96 in the supporting plate 42.

The opposite face of the plate 54, shown in Figure 3, is formed with a continuous annular surface 96 within which the ports 56 and 58 are included. The surface 96 is of somewhat greater area than the surface 86 for a purpose later to be described. Grooves 98 and 100 are formed inwardly and outwardly of the surface 96, and outwardly of the groove 100 the face is provided with a plurality of auxiliary bearing pads 102 separated by radial grooves 104.

In operation, the device functions as a pump in the manner well known to the art. It will be seen that, due to the smaller area of the surface 86 as compared with the surface 96, the pressure exerted in the oil film between members 42 and 54 along that surface is less than the pressure exerted in the oil film between members 54 and 74 along surface 96. Acccordingly, so long as the cylinder barrel remains in contact with wear plate 54, the pressure forces exerted in the oil film tend to hold the wear plate in contact with the supporting plate. Leakage draining radially inward from the surfaces 86 and 96 is carried to the interior of the casing through the passages 94 and 96. That escaping radially outward flows to the right past the outer periphery of the cylinder barrel 74.

While the form of embodiment of the invention as herein disclosed constitutes a preferred form, it is to be understood that other forms might be adopted, all coming within the scope of the claims which follow.

What is claimed is as follows:

1. In a fluid pressure energy translating device of the type having a casing member, a driving member and an arcuately ported plate-type valve actuated by relative rotation of the driving member and casing, a valve plate construction comprising a supporting plate having arcuate fluid passages therein, a wear plate having a valving surface and arcuate passages therethrough and adapted to register with the passages in the supporting plate, said wear plate being loosely mounted in abutment with the supporting plate, and means preventing relative rotation of said plates while leaving the wear plate unconstrained against movement toward and away from the supporting plate, whereby localized distortions of the supporting plate and wear plate are avoided.

2. In a fluid pressure energy translating device of the type having a stationary, arcuately ported valve plate and a revolving ported cylinder barrel, a valve plate construction comprising a supporting plate having arcuate fluid passages therein, a wear plate having an annular valving surface against which the cylinder barrel rotates and with arcuate passages therethrough, and means supporting the wear plate with its ports in register with the ports of the supporting plate and preventing rotation of the wear plate relative to the valve plate, the wear plate being mounted to freely move toward and away from the supporting plate under the sole influence of the cylinder barrel, whereby localized distortions of the plate surfaces are minimized.

3. In a fluid pressure energy translating device of the type having a stationary, arcuately ported valve plate and a revolving ported cylinder barrel, a valve plate construction comprising a separate wear plate mounted to "float" between the cylinder barrel and the remainder of the valve plate, and means for inhibiting rotation of the wear plate without affecting the abutting engagement of the plates relative to each other.

4. In a fluid pressure energy translating device of the type having a casing member, a driving member and an arcuately ported plate-type valve actuated by relative rotation of the driving member and casing, a valve plate construction comprising a supporting plate having arcuate fluid passages therein, and a wear plate having a valving surface and arcuate passages therethrough and adapted to register with the passages in the supporting plate, means securing said plates together, a contact surface formed on one of said plates in engagement with the other plate, said contact surface completely enclosing the arcuate fluid passages and having a significantly smaller area than said valving surface, and means for draining seepage from between said plates where they are not in contact.

5. In a fluid pressure energy translating device of the type having a casing member, a driving member and an arcuately ported plate-type valve actuated by relative rotation of the driving member and casing, a valve plate construction comprising a supporting plate having arcuate fluid passages therein, and a wear plate having an annular valving surface and arcuate passages therethrough and adapted to register with the passages in the supporting plate, means securing said plates together, an annular contact surface formed on one of said plates in engagement with the other plate, said contact surface completely enclosing the arcuate fluid passages and having a significantly smaller area than said valving surface, and means for draining seepage from between said plates on opposite sides, radially, of said contact surface.

HARRY F. VICKERS.
KENNETH R. HERMAN.